United States Patent [19]
Silva

[11] Patent Number: 5,544,797
[45] Date of Patent: Aug. 13, 1996

[54] FISHING ROD TRANSPORT APPARATUS

[76] Inventor: John H. Silva, 3301 Loma Vista, Waco, Tex. 96708

[21] Appl. No.: 314,339

[22] Filed: Sep. 28, 1994

Related U.S. Application Data

[63] Continuation of Ser. No. 808,074, Dec. 10, 1991, abandoned, which is a continuation of Ser. No. 728,008, Jul. 3, 1991, abandoned, which is a continuation of Ser. No. 460,824, Jan. 4, 1990, abandoned.

[51] Int. Cl.$^6$ .................................................... B60R 7/00
[52] U.S. Cl. ..................... 224/311; 224/318; 224/324; 224/560; 224/563; 224/922; 211/70.8
[58] Field of Search ..................... 224/311, 922, 224/324, 313, 42.46 R, 223, 318, 560, 563; 211/70.8; 43/21.2

[56] References Cited

U.S. PATENT DOCUMENTS

| | | | |
|---|---|---|---|
| 793,726 | 7/1905 | Kerney | 224/223 |
| 1,696,029 | 12/1928 | Chandler | 224/311 |
| 1,702,890 | 2/1929 | Brauer | 224/223 |
| 1,853,261 | 4/1932 | Dawson | 224/311 |
| 2,264,481 | 12/1941 | Peterson | 224/223 |
| 2,409,946 | 10/1946 | MacLeod | 224/318 |
| 2,536,797 | 1/1951 | Cooke | 211/70.8 |
| 2,859,904 | 11/1958 | Bilsky | 224/311 |
| 2,940,652 | 6/1960 | Willard | 224/922 |
| 3,155,299 | 11/1964 | Horne et al. | 224/324 |
| 3,376,614 | 1/1967 | Stahl, Jr. | |
| 3,524,572 | 11/1967 | Hall | |
| 3,792,775 | 2/1974 | Riddle et al. | |
| 4,424,907 | 1/1984 | Robb | |
| 4,995,537 | 2/1991 | Thedieck | 224/42.46 R |

*Primary Examiner*—Linda J. Sholl
*Attorney, Agent, or Firm*—Melvin A. Hunn; Felsman, Bradley, Gunter & Dillon

[57] ABSTRACT

A fishing rod carrier for use in a vehicle cab interior bounded in-part by a vehicle cab roof is provided for receiving a plurality of fishing rods having a handle at one end and a rod tip at the opposite end, and includes first and second carrier members. Each carrier member includes a first flexible non-elastomeric elongated strap having first and second ends. A second flexible elastomeric elongated strap is coupled to the first strap at selected locations but otherwise uncoupled to the first strap, and forms a plurality of elastomeric loops along the length of the first strap. Each loop defines a clearance of preselected dimensions between the first and second straps. A means is provided for releasably coupling the first and second ends of the first strap to the vehicle cab roof. The first and second carrier members are spaced apart a selected distance and positioned substantially parallel along the vehicle cab roof with the handle of each of the plurality of fishing rods disposed in one of the plurality of loops on one carrier member and with the tip of each of the plurality of fishing rods disposed in the corresponding loop in the opposite carrier member.

12 Claims, 4 Drawing Sheets

FISHING ROD TRANSPORT APPARATUS

This is a continuation, of application Ser. No. 07/808,074 filed Dec. 10, 1991, which is a continuation of Ser. No. 07/728,008 filed Jul. 3, 1991, which is a continuation of Ser. No. 07/460,824 filed Jan. 4, 1990, all now abandoned.

BACKGROUND OF THE INVENTION

1. Field of the Invention

This invention relates generally to devices which are used to transport fishing rods, and specifically to devices which are used for transporting fishing rods in the cab or cargo area of a motor vehicle.

2. Description of the Prior Art

A variety of devices exist for transporting fishing rods in a motor vehicle. Most are far too difficult to install in the motor vehicle, and are not easily removed when the fishing rods are not being transported. Consequently, most rod racks become permanent fixtures in the motor vehicle cab. For purposes of this application, the term "cab" shall include vehicle cargo areas, and the term "roof" shall include roofs, window moldings, and any structural member attached to the roof.

For example, U.S. Pat. No. 3,155,299, entitled "Rack For Fishing Rods," which issued Nov. 3, 1964, discloses a fishing rod transport rack which includes base members which are secured by screws to the vehicle cab roof, and three rod supports: a cross-bar with strapping material for receiving the fishing rod handles, a cross-bar with hooks for holding a midregion of the fishing rods, and a cross-bar with padding for receiving the rod tips.

In U.S. Pat. No. 3,376,614, entitled "Fishing Rod Holder," which issued Apr. 9, 1968, an alternate fishing rod rack is disclosed which includes a fixed clamping member and a lower swingable clamping member. The inner surfaces of the fixed and swingable clamp members are lined with a spongy material to insulate the fishing rods from shock.

U.S. Pat. No. 3,524,572, entitled "Fish Pole Carrier," which issued Nov. 24, 1967, discloses a fishing rod carrier with elaborate mechanical structures which are mounted to the vehicle roof for receiving the handles and tips of fishing rods, and includes rigid tubular structures for receiving the rod tips and mechanisms for releasably gripping the rod handles. Likewise, U.S. Pat. No. 3,792,775, entitled "Fishing Pole Supports," which issued Feb. 19, 1974, discloses a rod carrier which includes a plurality of plates which mount to the vehicle cab roof for gripping the fishing rods.

SUMMARY OF THE INVENTION

It is one object of the present invention to provide a simple, durable, and convenient carrier for one or more fishing rods for use in a motor vehicle.

It is another object of the present invention to provide a carrier for one or more fishing rods for use in the cab of the motor vehicle which is easily disassembled for storage when not in use.

It is yet another object of the present invention to provide a simple fishing rod carrier which accommodates a number of fishing rods in a vehicle without diminishing the passenger and storage space of the vehicle cab.

It is still another object of the present invention to provide a fishing rod carrier which will store a number of rods safely during travel, and prevent damage to the rods.

It is another object of the present invention to provide a fishing rod transport rack which may be installed and removed with ease.

It is still another object of the present invention to provide a fishing rod transport rack which may accommodate a variety of fishing rod sizes.

The foregoing objects are achieved as is now described. A fishing rod carrier for use in a vehicle cab interior bounded in-part by a vehicle cab roof is provided for receiving a plurality of fishing rods having a handle at one end and a rod tip at the opposite end, and includes first and second carrier members. Each carrier member includes a first flexible non-elastomeric elongated strap having first and second ends. A second flexible elastomeric elongated strap is coupled to the first strap at selected locations but otherwise uncoupled to the first strap, and forms a plurality of elastomeric loops along the length of the first strap. Each loop defines a clearance of preselected dimensions between the first and second straps. A means is provided for releasably coupling the first and second ends of the first strap to the vehicle cab roof or window molding. The first and second carrier members are spaced apart a selected distance and positioned substantially parallel along the vehicle cab roof with the handle of each of the plurality of fishing rods disposed in one of the plurality of loops on one carrier member and with the tip of each of the plurality of fishing rods disposed in the corresponding loop in the opposite carrier member.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
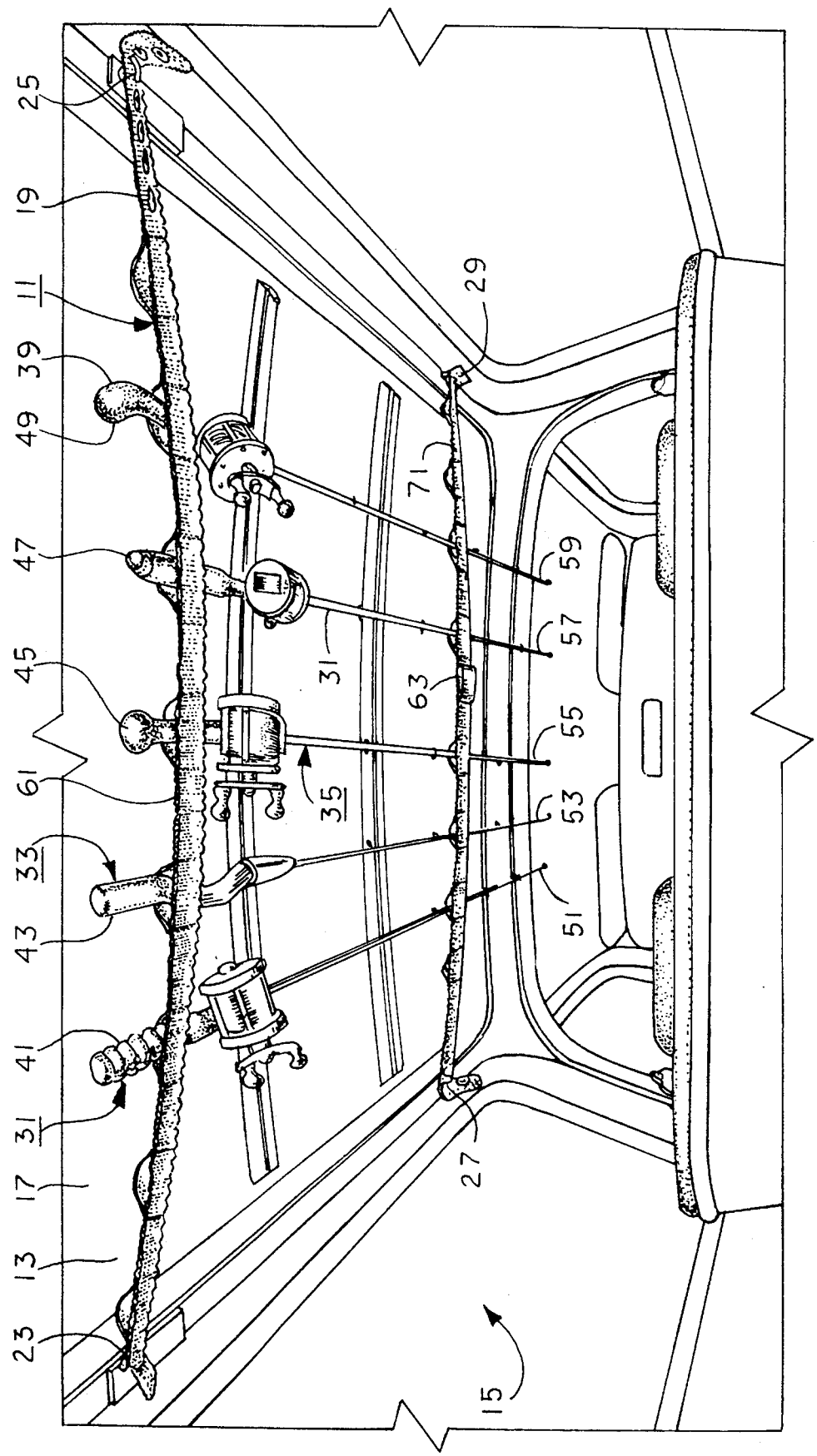
FIG. 1 is a perspective view of the interior of a vehicle cab equipped with the preferred fishing rod transport apparatus of the present invention supporting a plurality of fishing rods.

FIG. 1 is a perspective view of the preferred fishing rod transport apparatus installed in the cab of a motor vehicle, and supporting a plurality of fishing rods. Fishing rod transport apparatus 11 is disposed within cab 13 of motor vehicle 15, and is releasably secured to vehicle cab roof 17. In the preferred embodiment, fishing rod transport apparatus 11 includes first carrier member 19 and second carrier member 23 which are releasably secured to vehicle cab roof 17 by fastener means 23, 25, 27, 29. As shown in FIG. 1, fishing rod transport apparatus 11 is suitable for carrying a plurality of fishing rods 31, 33, 35, 37, and 39. Each fishing rod 31, 33, 35, 37, and 39 includes rod handles 41, 43, 45, 47, 49, and rod tips 51, 53, 55, 57, and 59 respectively.

Figure 2:
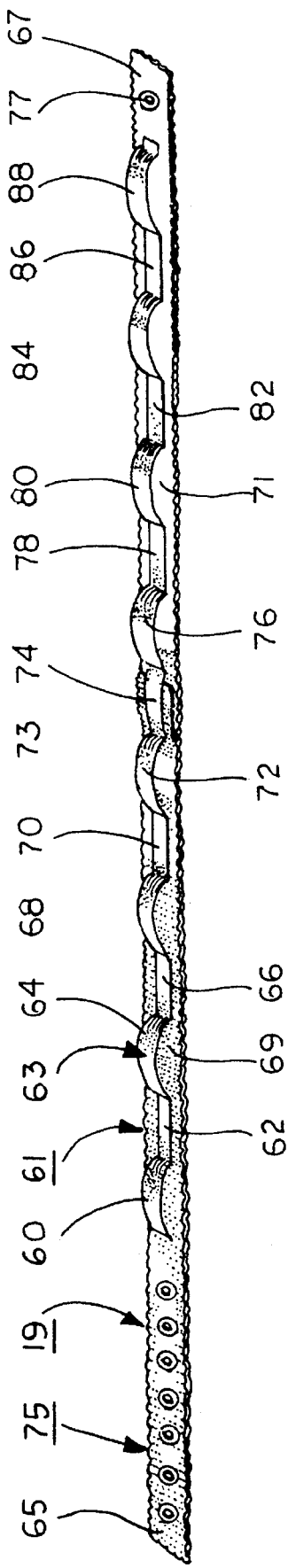
FIG. 2 is a perspective view of one carrier member of the preferred fishing rod transport apparatus of the present invention.

FIG. 2 is a perspective view of first carrier member 19 of FIG. 1. First carrier member 19 includes first strap 61, which in the preferred embodiment is a flexible non-elastomeric elongated strap having first and second ends 65, 67. In the preferred embodiment, first strap 61 comprises a first segment of polypropylene fabric 69 which is coupled to second segment 71 of polypropylene fabric at expansion joint 73.

A plurality of metal eyelets 75 are provided at first end 65 of first strap 61 for releasably coupling to fasteners which are provided in vehicle cab roof 17. In the preferred embodiment, seven axially aligned metal eyelets are provided at first end 65. Eyelets 75 are spaced apart an identical preselected distance, to allow for the adjustment of fishing rod transport apparatus 11 to accommodate a variety of motor vehicle types, as well as to accommodate a number and variety of fishing rods. Second end 67 is likewise equipped with eyelet 77 which couples to a fastener provided in vehicle cab roof 17.

Second strap 63 is a flexible elastomeric material, which serves to maintain fishing rods 31, 33, 35, 37, and 39 in position along the load bearing first strap 61. Second strap 63 is coupled to first strap 61 at selected locations to form a plurality of elastomeric loops 60, 62, 64, 66, 68, 70, 72, 74, 76, 78, 80, 82, 84, 86, and 88 (hereinafter collectively referred to as loops 58) along the length of first strap 61, each defining a clearance of a preselected dimension between the first strap 61 and second strap 63. As shown in FIG. 2, some loops 58 are in substantially planar contact with first strap 61 (for example, loops 62, 66, 70, 74, 78, 82, and 86). Other loops 58 are connected in a manner to allow second strap 63 to stand above first strap 61 with a visible clearance between first strap 61 and second strap 63 (for example, loops 60, 64, 68, 72, 76, 80, 84, and 88). In the preferred embodiment, loops 58 which provide the least clearance between first strap 61 and second strap 63 are useful for securing rod tips 51, 53, 55, 57, and 59. In contrast, loops 58 which provide the most clearance between first strap 61 and second strap 63 are useful for securing rod handles 41, 43, 45, 47, and 49. Loops 58 with smaller clearances may be used for smaller diameter handles, or to achieve a tighter fit.

Figure 3:
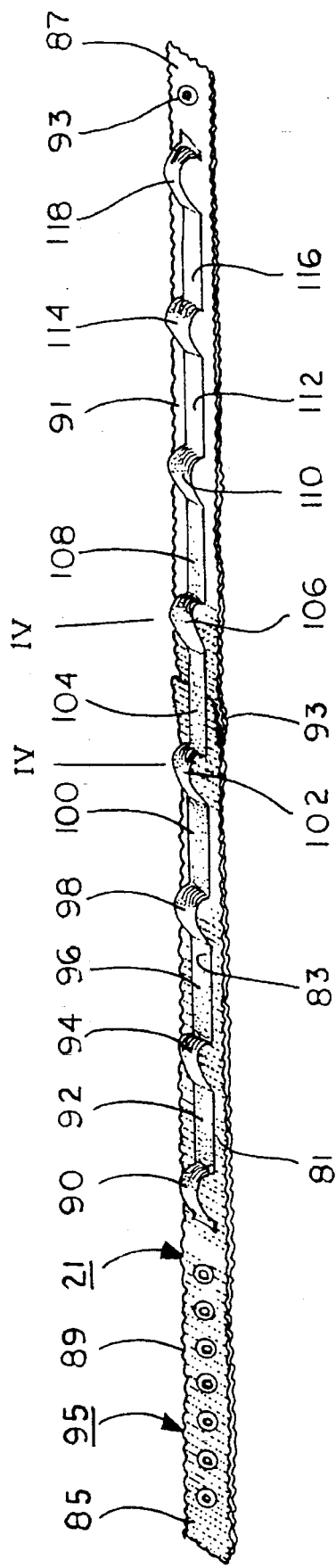
FIG. 3 is perspective view of a second carrier member of the preferred fishing rod transport apparatus of the present invention.

Turning now to FIG. 3, second carrier member 21 will now be described in detail. Second carrier member 21 includes first strap 81, which in the preferred embodiment is a flexible non-elastomeric elongated strap having first and second ends 85, 87. In the preferred embodiment, first strap 81 comprises a first segment of polypropylene fabric 89 which is coupled to second segment 91 of polypropylene fabric at expansion joint 93.

A plurality of metal eyelets 95 are provided at first end 85 of first strap 81 for releasably coupling to fasteners which are provided in vehicle cab roof 17. In the preferred embodiment, seven axially aligned metal eyelets are provided at first end 85. Eyelets 95 are spaced apart an identical preselected distance, to allow for the adjustment of fishing rod transport apparatus 11 to accommodate a variety of motor vehicle types, as well as to accommodate a number and variety of fishing rods. Second end 87 is likewise equipped with eyelet 97 which couples to a fastener provided in vehicle cab roof 17.

Second strap 83 is a flexible elastomeric material, which serves to maintain fishing rods 31, 33, 35, 37, and 39 in position along the load bearing first strap 81. Second strap 83 is coupled to first strap 81 at selected locations to form a plurality of elastomeric loops 90, 92, 94, 96, 98, 100, 102, 104, 106, 108, 110, 112, 114, 116, and 118 (hereinafter collectively referred to as loops 58) along the length of first strap 81, each defining a clearance of a preselected dimension between the first strap 81 and second strap 83. As shown in FIG. 3, some loops 58 are in substantially planar contact with first strap 81 (for example, loops 92, 96, 100, 104, 108, 112, and 116). Other loops 58 are connected in a manner to allow second strap 83 to stand above first strap 81 with a visible clearance between first strap 81 and second strap 83 (for example, loops 90, 94, 98, 102, 106, 110, 114, and 118). In the preferred embodiment, loops 58 which provide the least clearance between first strap 81 and second strap 83 are useful for securing rod tips 51, 53, 55, 57, and 59. In contrast, loops 58 which provide the most clearance between first strap 81 and second strap 83 are useful for securing rod handles 41, 43, 45, 47, and 49.

Figure 4:
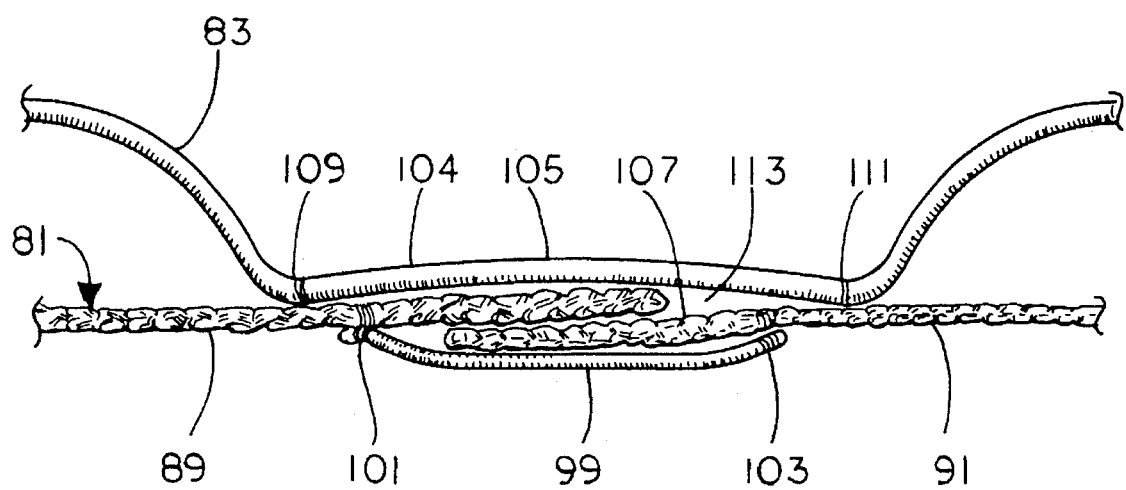
FIG. 4 is cross-section view as seen along lines IV—IV of FIG. 3.

FIG. 4 is a cross-section view of expansion joint 93 of FIG. 3 as seen along lines IV—IV. As shown, first segment 89 and second segment 91 of first strip 81 are interconnected by expansion segment 99. Expansion segment 99 is joined to first segment 89 at coupling 101, and to second segment 91 at coupling 103. In the preferred embodiment, couplings 101, 103 and the other couplings between first strip 81 and second strip 83 comprise stitching or sewing. In the preferred embodiment, expansion segment 99 comprises a flexible elastomeric fabric. Expansion flaps 105, 107 overlie expansion segment 99 to prevent damage to expansion segment 99 by frictional contact with the fishing rod. Of course, either the rod handle or rod tip may be inserted between first strip 81 and second strip 83 in the clearance provided by loop 104. As shown in FIG. 4, loop 104 is formed by coupling second strip 83 to first strip 81 at couplings 109 and 111. In the preferred embodiment, couplings 109, 111, comprise stitching. A clearance 113 is provided between first strip 81 and second strip 83. As discussed above, clearance 113 is suitable for accommodating the fishing rod tips 51, 53, 55, 57, and 59.

Figure 5:
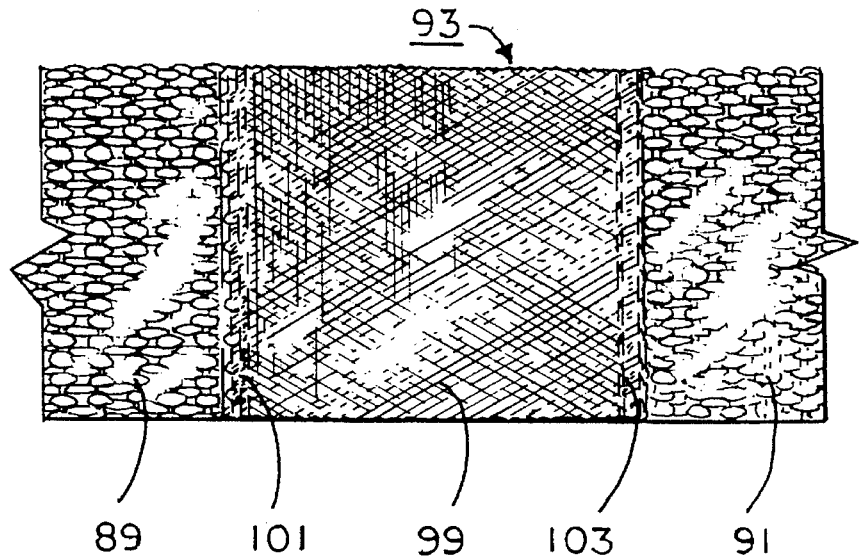
FIG. 5 is a bottom plan view of the expansion joint of one carrier member of the preferred fishing rod transport apparatus of the present invention.

FIG. 5 is a bottom plan view of expansion joint 93 of FIG. 4. Polypropylene first segment 81 is shown coupled to expansion segment 99 at coupling 101. On the opposite side, second segment 91 is coupled to expansion segment 99 at coupling 103.

Figure 6:
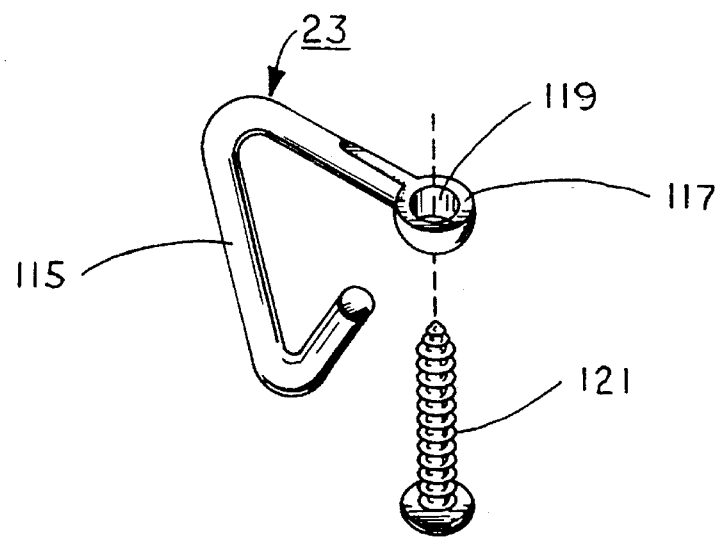
FIG. 6 is a perspective view of a hook and screw which are mountable in the vehicle cab roof for releasably coupling with the first and second carrier members of the fishing rod transport apparatus of the present invention.

FIG. 6 depicts fastener means 23 of FIG. 1 in greater detail. Of course, fastener means 25, 27, and 29 are similar to fastener means 23 depicted in FIG. 6. Fastener means 23 includes hook 115 which is integrally formed with flange 117. Flange 117 includes screw bore 119. Externally threaded screw 121 couples hook 115 in place at flange 117 by engaging vehicle cab roof 117 by its external threads. Hook 115 may be quickly and easily coupled and decoupled from the metal eyelets of first and second carrier members 19, and 21. The plurality of axially aligned eyelets 75, 95 of first and second carrier members 19, 21 allow for the incremental adjustment of the clearance between first and second carrier members 19, 21 and vehicle cab roof 17. Of course, operation is optimized if the intrusion on passenger and storage space is minimized, and the fishing rods are held firmly in place.

The fishing rod transport apparatus of the present invention has many significant advantages over existing prior art fishing transport systems. First, the transport apparatus of the present invention is easy to install in motor vehicles. Once the fastener means are secured to the roof of the vehicle cab, the first and second carrier members may be quickly and easily installed, taken out, or adjusted.

The fishing rod transport apparatus of the present invention is also easily stored. Since first and second carrier members are composed substantially of flexible materials, they may be stored by placing them in the vehicle glove compartment, or underneath the vehicle seat. In contrast, existing prior art fishing transport racks included a number of rigid components which could not be easily stored.

In the fishing rod transport apparatus of the present invention, one flexible strap serves as a load bearing member for holding the weight of the fishing rods, while the second flexible strap serves as a positioning member to secure the fishing rods in place. A plurality of loops are provided, of varying dimensions, to allow for the transportation of a variety of fishing rod types.

Expansion joints are provided in the first and second carrier members of the fishing rod transport apparatus of the present invention. These expansion joints serve to keep the transport rack and fishing rods in close proximity to the vehicle roof. In addition, the expansion joints allow for some automatic adjustment in the position of the fishing rod transport apparatus. Specifically, the expansion joint allows the load bearing straps of the first and second carrier members to expand to accommodate additional fishing rods by stretching in response to the increased weight load, and to minimize sagging of the load bearing straps by contracting in response to a decrease in load.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A fishing rod carrier for use in a vehicle cab interior bounded in-part by a vehicle cab roof, for receiving a plurality of fishing rods having a handle at one end and a rod tip at the opposite end, comprising:

(a) a first carrier member, including:
        a plurality of segments of flexible elongated material;
        at least one flexible elastomeric expansion joint secured between successive ones of said plurality of segments of flexible elongated material;
        said plurality of segments of flexible elongated material and said at least one flexible elastomeric expansion joint together forming a load-bearing strap with upper and lower surfaces and first and second ends;
        a positioning strap of flexible elastomeric material coupled to said load bearing strap at selected locations to form a plurality of elastomeric loops along said upper surface of said load bearing strap, each loop defining a clearance between said load-bearing strap and said positioning strap;
        means for releasably coupling said first and second ends of said first strap to said vehicle cab roof;

(b) a second carrier member, including:
        a plurality of segments of flexible elongated material;
        at least one flexible elastomeric expansion joint secured between successive ones of said plurality of segments of flexible elongated material;
        said plurality of segments of flexible elongated material and said at least one flexible elastomeric expansion joint together forming a load-bearing strap with upper and lower surfaces and first and second ends;
        a positioning strap of flexible elastomeric material coupled to said load bearing strap at selected locations to form a plurality of elastomeric loops along said upper surface of said load bearing strap, each loop defining a clearance between said load-bearing strap and said positioning strap;
        means for releasably coupling said first and second ends of said first strap to said vehicle cab roof; and (c) wherein said at least one expansion joint allows said load bearing straps of said first and second carrier members to expand to accommodate additional fishing rods by stretching in response to the increased load, and which minimizes sagging to said load-bearing straps by contracting in response to a decrease in load.

2. A fishing rod carrier for use in a vehicle cab interior according to claim 1, wherein said means for releasably coupling said first and second carrier members comprise:

first and second hooks for coupling to said vehicle cab roof;
    at least one eyelet disposed at one end of said strap for releasably coupling to said first hook; and
    at least one eyelet disposed at the opposite end of said first strap for releasably coupling to said second hook.

3. A fishing rod carrier for use in a vehicle cab interior according to claim 1, wherein selected ones of said plurality of elastic loops of said first and second carrier members are in substantially planar contact with said first straps.

4. A fishing rod carrier for use in a vehicle, for receiving a plurality of fishing rods having a handle at one end and a rod tip at the opposite end, comprising:

a first carrier member, including:
        a flexible and elongated support strap having first and second ends;
        a plurality of flexible retainer loops, each secured to said flexible and elongated support strap; and
        means for securing said first and second ends of said flexible and elongated support strap in a selected and fixed position relative to said vehicle;
    a second carrier member, including:
        a flexible and elongated support strap having first and second ends;
        a plurality of flexible retainer loops, each secured to said flexible and elongated support strap;
        means for securing said first and second ends of said flexible and elongated support strap in a selected and fixed position relative to said vehicle; and
    wherein during a carrying mode of operation, said first and second carriers are placed in parallel alignment within said vehicle, with selected loops on first and second carriers receiving and retaining said handle and said rod tip to maintain said plurality of rods in positions substantially normal to said first and second carriers and in a fixed position along said first and second carrier members with respect to said first and second ends, out of physical contact with one another; and
    at least one flexible expansion joint coupled between selected portions of at least one of said first and second carrier members to allow accommodation of additional fishing rods by stretching and which minimizes sagging by contracting in response to removal of a fishing rod.

5. A fishing rod carrier according to claim 4, wherein said plurality of flexible retainer loops which are secured to said first and second carrier members define an adjustable clearance with respect to said first and second carrier members.

6. A fishing rod carrier according to claim 4, wherein said plurality of flexible retainer loops which are secured to said first and second carrier members define an adjustable clearance with respect to said first and second carrier members.

7. A fishing rod carrier according to claim 6, wherein said plurality of retainer loops are formed of an elastomeric material.

8. A fishing rod carrier according to claim 4, wherein first and second flexible bands which are secured at selected locations to said flexible and elongated support straps of said first and second carrier members and define said plurality of retainer loops.

9. A fishing rod carrier according to claim 8, wherein selected portions of said first and second flexible bands are in substantially planar contact with regions of said elongated support straps of said first and second carrier members, and selected portions of said first and second flexible bands define an arc with respect to said flexible and elongated support straps of said first and second carrier members.

10. A fishing rod carrier according to claim 4, wherein said plurality of flexible retainer loops are at least in-part formed of a material which resists deformation and which biases said fishing rods into contact with said flexible and elongated support straps of said first and second carrier members.

11. A fishing rod carrier according to claim 4, wherein said at least one flexible expansion joint allows elongation and contraction of said flexible and elongated support straps of at least one of said first and second carrier members to compensate for the addition or removal of selected ones of said plurality of fishing rods.

12. A fishing rod carrier according to claim 11, wherein said at least one flexible expansion joint allows for automatic elongation and contraction of said flexible and elongated support straps of said first and second carrier members to compensate for the addition or removal of selected ones of said plurality of fishing rods.

* * * * *